United States Patent
Davis (10) Patent No.: US 10,939,272 B1
(45) Date of Patent: Mar. 2, 2021

(54) SYSTEM AND METHOD FOR CONSTRUCTION JOBSITE PERSONNEL MANAGEMENT

(71) Applicant: Michael Wayne Davis, Apex, NC (US)

(72) Inventor: Michael Wayne Davis, Apex, NC (US)

( * ) Notice: Subject to any disclaimer, the term of this patent is extended or adjusted under 35 U.S.C. 154(b) by 0 days.

(21) Appl. No.: 16/694,499

(22) Filed: Nov. 25, 2019

(51) Int. Cl.
| | |
|---|---|
| *H04W 4/90* | (2018.01) |
| *G06Q 50/08* | (2012.01) |
| *G06Q 10/10* | (2012.01) |
| *H04W 4/021* | (2018.01) |
| *H04W 48/20* | (2009.01) |
| *H04W 4/029* | (2018.01) |
| *G06Q 50/26* | (2012.01) |
| *H04W 84/12* | (2009.01) |

(52) U.S. Cl.
CPC ............ *H04W 4/90* (2018.02); *G06Q 10/105* (2013.01); *G06Q 50/08* (2013.01); *G06Q 50/265* (2013.01); *H04W 4/021* (2013.01); *H04W 4/029* (2018.02); *H04W 48/20* (2013.01); *H04W 84/12* (2013.01)

(58) Field of Classification Search
CPC ....... H04W 4/90; H04W 4/029; H04W 4/021; H04W 48/20; H04W 84/12; G06Q 50/08; G06Q 10/105; G06Q 50/265
See application file for complete search history.

(56) References Cited

U.S. PATENT DOCUMENTS

| | | | |
|---|---|---|---|
| 9,047,648 B1* | 6/2015 | Lekutai | G16H 40/67 |
| 2010/0048160 A1* | 2/2010 | Lekutai | H04W 4/90 |
| | | | 455/404.1 |
| 2010/0317317 A1* | 12/2010 | Maier | H04W 4/029 |
| | | | 455/404.2 |
| 2011/0019587 A1* | 1/2011 | Wang | H04W 4/02 |
| | | | 370/254 |
| 2015/0312739 A1* | 10/2015 | Burt | A61B 7/00 |
| | | | 455/404.1 |
| 2017/0278378 A1* | 9/2017 | Kaplita | H04W 4/90 |
| 2020/0077250 A1* | 3/2020 | Gideon, III | H04W 4/029 |
| 2020/0153796 A1* | 5/2020 | Lin | H04L 63/0272 |
| 2020/0187150 A1* | 6/2020 | Eisner | H04W 4/029 |
| 2020/0252780 A1* | 8/2020 | McClendon, IV | H04W 4/90 |

\* cited by examiner

*Primary Examiner* — Julio R Perez (74) *Attorney, Agent, or Firm* — John L. Sotomayor (57) ABSTRACT

A system and method for managing jobsite personnel is presented. An application registers Wi-Fi enabled mobile devices on a geographically-defined jobsite, associates them with individual workers, and associates the workers' devices with the particular jobsite. The application logs registered devices when the devices come within the physical boundaries of the associated jobsite. An administrator may receive reports on all registered mobile devices. In an emergency requiring jobsite evacuation, a server communicates to each logged mobile device a message requiring time-sensitive compliance. Compliance is tracked and recorded. The server can provide to the administrator one or more compliance reports.

11 Claims, 6 Drawing Sheets

SYSTEM AND METHOD FOR CONSTRUCTION JOBSITE PERSONNEL MANAGEMENT

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Within the field of mobile device management, location-based information technologies have been used to predict mobile device locations and provide services to the users thereof. Geo-fencing techniques, among others, have been used to define mobile device user habits and tendencies, and to provide insight into products and services which may appeal to a unique user. Such techniques may supply real-time or historical data, and may use beacons or network nodes to facilitate collection and analysis of such data. Commonly, a wearable device is capable of detection by a scanner using standard network technology. Detection of the device by the scanner can be used for automated population of database information, or for advertising multiple data sets.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

In an embodiment of the instant innovation, workers on a construction jobsite are required to attend a safety training meeting when first reporting to the jobsite. Such workers may be employees of any of the principal parties on a jobsite, including by way of non-limiting example, the General Contractor, Sub-Contractors, Consultants, Building Inspectors and anyone else performing services in the construction process. During the initial safety meeting, each worker who possesses a cell phone or similar Wi-Fi enabled device will be instructed to register his or her Wi-Fi enabled device with the wireless internet service associated with the particular jobsite at which the construction work to be monitored will be performed. Although wireless internet service may be provided by any of a number of service providers, in a non-limiting example, such wireless internet service may be provided by Site Security Systems, LLC, a North Carolina Limited Liability Company.

Upon initial connection of a mobile device to the wireless internet service, each mobile device operator will be prompted to provide, by way of non-limiting example, his or her name, cell phone number or other mobile device designation, and the trade (plumber, framer, electrician, etc.) in which the mobile device operator is engaged for the purposes of the project currently in process at a construction jobsite. The instant innovation may then send a Short Message Service (SMS) text message to each mobile device so connected, prompting each mobile device operator to confirm the phone number and to follow a hyperlink to further confirm the identity of the individual associated with the mobile device with which the phone number has been activated.

In an embodiment, as the individuals associated with each mobile device present themselves in their capacities as jobsite workers, the instant innovation may record the entry, exit and presence on a jobsite of the mobile device and, by extension, the individual associated with the mobile device. To be recognized by the present invention, each individual worker needs only to carry the registered Wi-Fi enabled mobile device while working on the jobsite.

In the event of an emergency which requires immediate communication with all or a subset of workers presently on a particular jobsite, the instant innovation coordinates the sending of SMS text messages to every worker whose mobile device the instant innovation has recorded as 'Present' on the jobsite. If evacuation of the jobsite is required, the instant innovation communicates appropriate evacuation instructions to each mobile device. In an optional embodiment, the instant innovation may include a hyperlink in the text message, such hyperlink providing an immediately answerable prompt to the recipient of the message, to confirm that the recipient has safely evacuated the jobsite.

In an embodiment, where a jobsite emergency requires verifiable worker evacuation of the jobsite, the instant innovation would cause all registered mobile devices to receive a warning SMS text message. The text message would instruct each recipient of the message to evacuate to a safe perimeter around the jobsite within a pre-configured, measurable period of time. The instant innovation would track the geo-position of each mobile device as the operator associated with the mobile device moves across the dangerous jobsite and until arriving at a geographical point outside the pre-configured, measurable safe perimeter geographic boundary. The instant innovation would permit the logging of the duration of each mobile device within the jobsite as well as the geo-positioning of each mobile device during the period of evacuation.

In an embodiment, the system may transmit to each mobile device a description, either in text or in a visual image, of the pre-configured geographic boundary that has been established as the physical area beyond which all mobile devices and the individuals associated with each mobile device should relocate. Once the worker/operator of a mobile device has reached a point beyond the safe perimeter as represented by the pre-configured geographic boundary, the instant innovation may prompt the operator to verify their relocation to a physical point outside of the pre-configured geographic boundary. The verification of the location of the mobile device may be performed through a verification of the location of the mobile device as represented by the GPS coordinates of the location of the mobile device. The verification of the individual may be performed through the requirement of a response from an individual utilizing the mobile device having a known safe physical location to a text, SMS, or other message transmitted from the system to the mobile device. If the individual does not respond to the verification request message sent to the mobile device having a known physical location, the system may place the individual worker in an unknown status as opposed to an evacuated status and issue the individual's name to the safety officer for further follow-up as to location.

In various embodiments, an individual associated with a mobile device may be presented with a sign-in page when connected to a designated Wi-Fi network, whereupon the individual may select an employer name from a pre-populated list of employers, and a work role from a pre-populated list of roles. To register with the site security system, the worker may enter the name to be associated with a particular mobile device, and may enter a phone number to be associated with the mobile device. The worker may both receive and reply to SMS text messages from the system. When leaving the jobsite, the worker may be presented with a sign-out page to remove his or her mobile device from the list of logged devices that are currently present within the established geographic boundaries of the jobsite.

In an embodiment, Operators of the site security system and method (including but not limited to the General Contractor administrator) may have online web access to multiple real-time and historical personnel reports and data associated with all individuals present or not-present within the physical boundaries of the jobsite. In a non-limiting example, such reports and data may include information regarding current and historical worker presence, with such data separated by Trade (by way of explanation and not of limitation, Trades may include plumber, framer, electrician), Hourly Total Headcount, and Hourly Weather Conditions. In an embodiment, Hourly Weather Conditions may be based upon reports from the National Weather Service and be correlated by postal zip code. Data for a Detailed List of Workers on the Jobsite and Occupational Safety and Health Agency (OSHA) Compliant Worker Lists may similarly be separated as line items. In the event of an evacuation, the instant innovation provides a report on all individual workers associated with mobile devices, including a list of workers associated with mobile devices that have not been confirmed to have reached a safe perimeter within the prescribed period of time.

Individuals designated as Operators of the site security system may also have access to an online dashboard providing each Operator with real-time system data. The dashboard can be accessed via any web browser running on any web-enabled mobile device, including by not limited to smart phones, tablets, and personal computers. In a non-limiting example, the dashboard is designed to run on a monitor in the construction office of the jobsite as well.

In an embodiment, Operators can send standardized and customizable messages to all workers on a jobsite, a subset of workers on a jobsite, or one or more individuals on a jobsite. Non-limiting examples of standardized and customizable messages include Evacuation Requests, Inclement Weather Warnings, Jobsite-Related Messages, Coordination of Equipment Logistics, Notification to Contact General Contractor, Notification to Report to Construction Office, Subcontractor/Trade-specific Communications, General Safety Information, Regular Safety Training Information, Requests for Assistance, and Meeting Requests. In no way should the foregoing list be considered an exhaustive list of messages that may be transmitted to individuals registered with the site security system as additional messages may be created and added to this list in response to additional requirements for general use or particular jobsite needs.

In an embodiment, Operators can set triggers for the instant invention to send email alerts or text alerts to system administrators if unauthorized or unidentified Wi-Fi enabled devices enter the jobsite during specified hours. In a non-limiting example, between 7 pm and 7 am when the jobsite is closed an alert can be sent if anyone carrying a cell phone or other Wi-Fi enabled device enters the job site, whether the mobile, Wi-Fi enabled device is registered to the system or not.

In an embodiment, Operators such as the jobsite administrator may view a visualization, such as a pie chart or other suitable graphical representation, reflecting system data including but not limited to the number and identities of the workers on the jobsite. The system allows Operators to manage subcontractor companies present on the jobsite. The system allows Operators to initiate an emergency evacuation and review a subsequent evacuation report including data produced based upon dynamic, real-time worker presence information.

Figure 1:
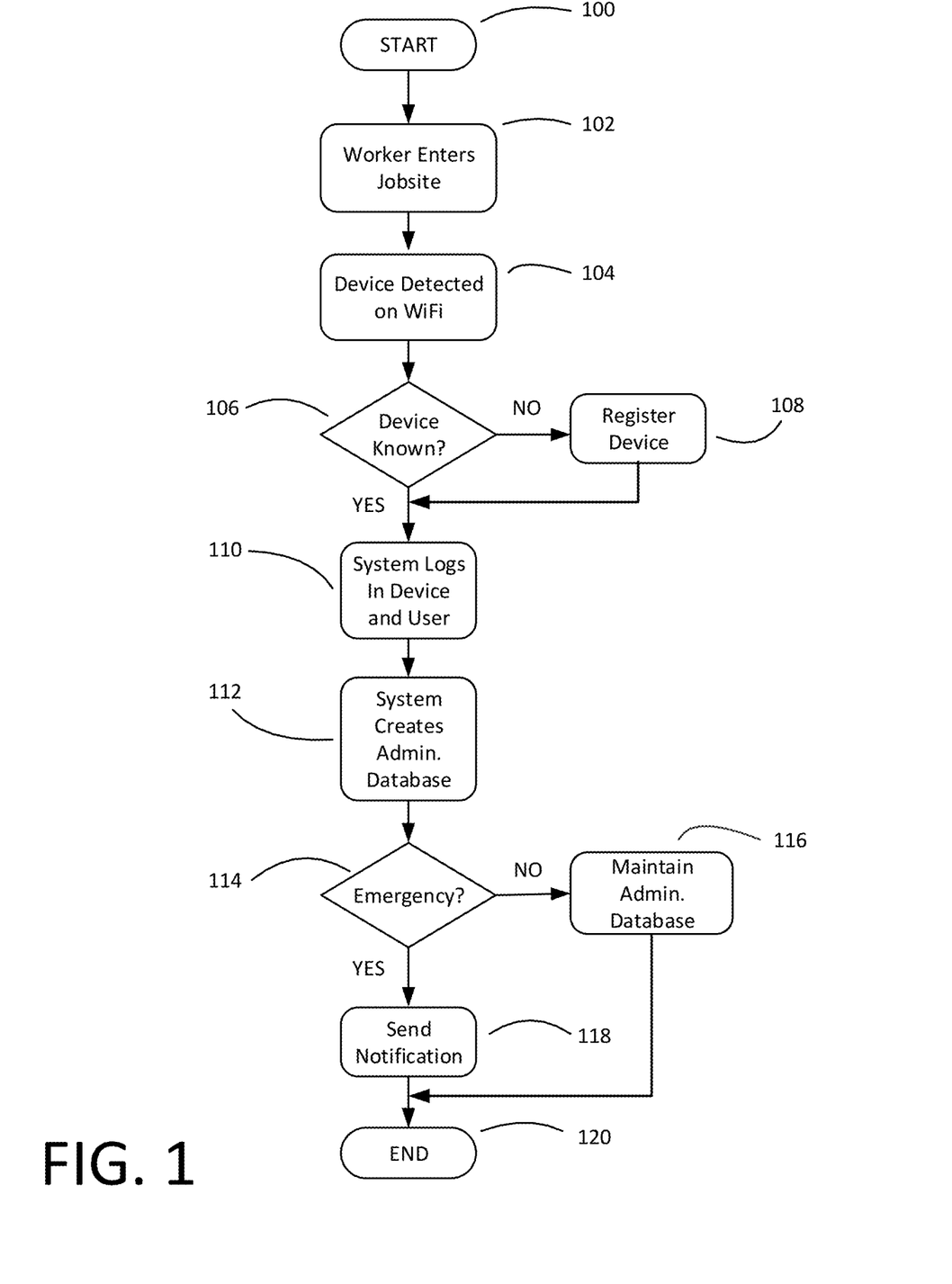
FIG. 1 is a process flow diagram consistent with certain embodiments of the present invention.

Turning now to FIG. 1, a process flow diagram consistent with certain embodiments of the present invention is shown. At 100, the process begins. When at 102 a Worker Enters a Jobsite, that worker's mobile device is detected by the jobsite-specific Wi-Fi network at 104. If at 106 the device is not registered with and is unknown to the system, at 106 the device is prompted to register. The system stores and maintains data for subcontractor companies and individual workers. If at 106 the device is registered with and known to the system, at 110 the system automatically logs in the device as belonging to and accompanying the worker/user. At 112 the system creates an administrative database which includes at least identifying information about the registered mobile device, including the associated worker/user. The system maintains records showing the subcontractor companies and subcontractor and individual roles and helps an Operator anticipate which subcontractors, individuals and roles will be associated with a particular jobsite. If at 114 no emergency occurs, the administrative database is maintained without alerts. However, if at 114 an emergency occurs, the system at 118 sends emergency notification to all registered mobile devices logged into the administrative database and identified as being physically located within a geofenced boundary that corresponds to the jobsite. At 120 the process ends.

Figure 2:
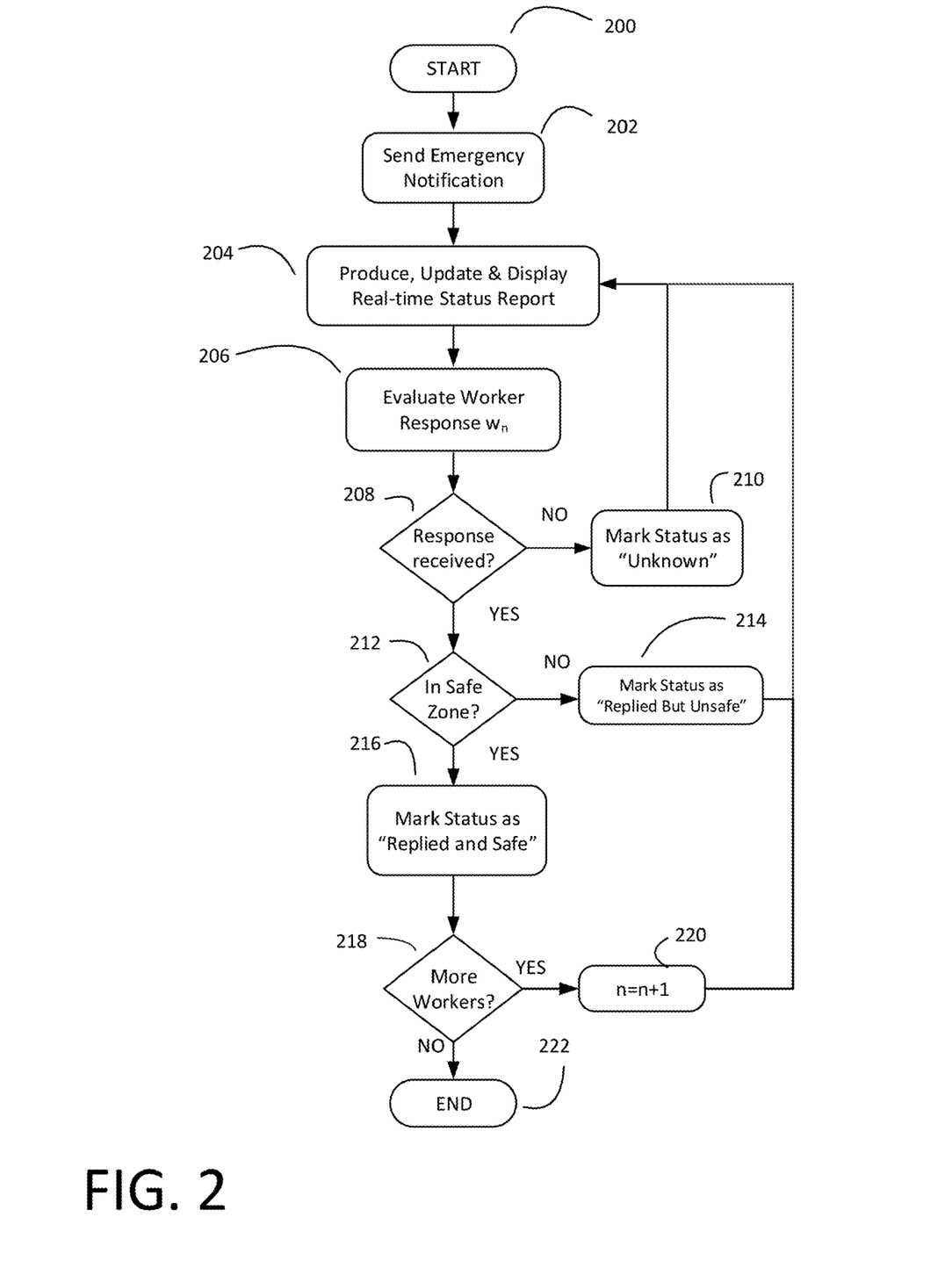
FIG. 2 is a process flow diagram of the emergency management sub-process consistent with certain embodiments of the present invention.

Turning now to FIG. 2, a process flow diagram of the emergency management sub-process consistent with certain embodiments of the present invention is shown. The sub-process begins at 200. At 202, in response to the occurrence of a jobsite emergency, the system sends an emergency notification to all registered mobile devices logged into the administrative database and whose status indicates that the mobile devices are physically located within the pre-established geographic boundary of a jobsite. At 204 the system produces, updates, and displays a real-time numbered status report of the worker responses received from the registered mobile devices to which an emergency notification has been sent. Worker responses may be manually initiated by the worker from the worker's mobile device in response to the emergency notification. At 206 the system evaluates the worker response for each individual numbered worker $w_n$, singly iterating n from 1 to x, where x represents the total number of registered mobile devices to which emergency notifications have been transmitted. If at 208 no response has been received from worker $w_n$, that worker's status is marked as "Unknown" at 210, and the status is returned to update the real-time status report at 204. If at 208 a response has been received from worker $w_n$, the system at 212 queries whether worker $w_n$ is in a safe zone. If not, at 214 the system marks the status of worker $w_n$ as "Replied But Unsafe," and the status is returned to update the real-time status report at 204. If at 212 worker $w_n$ is determined to be in a safe zone, at 216 the system marks the status of worker $w_n$ as "Replied and Safe," and the status is returned to update the real-time status report at 204. If at 218, n<x (meaning that the number of logged mobile devices, and thus, the number of associated workers, is greater than 1, and that more workers remain to be evaluated for safety) then at 220 the system iterates to the next numbered worker and at 206 the worker response is evaluated. If at 218 n=x, the sub-process ends at 222.

Figure 3:
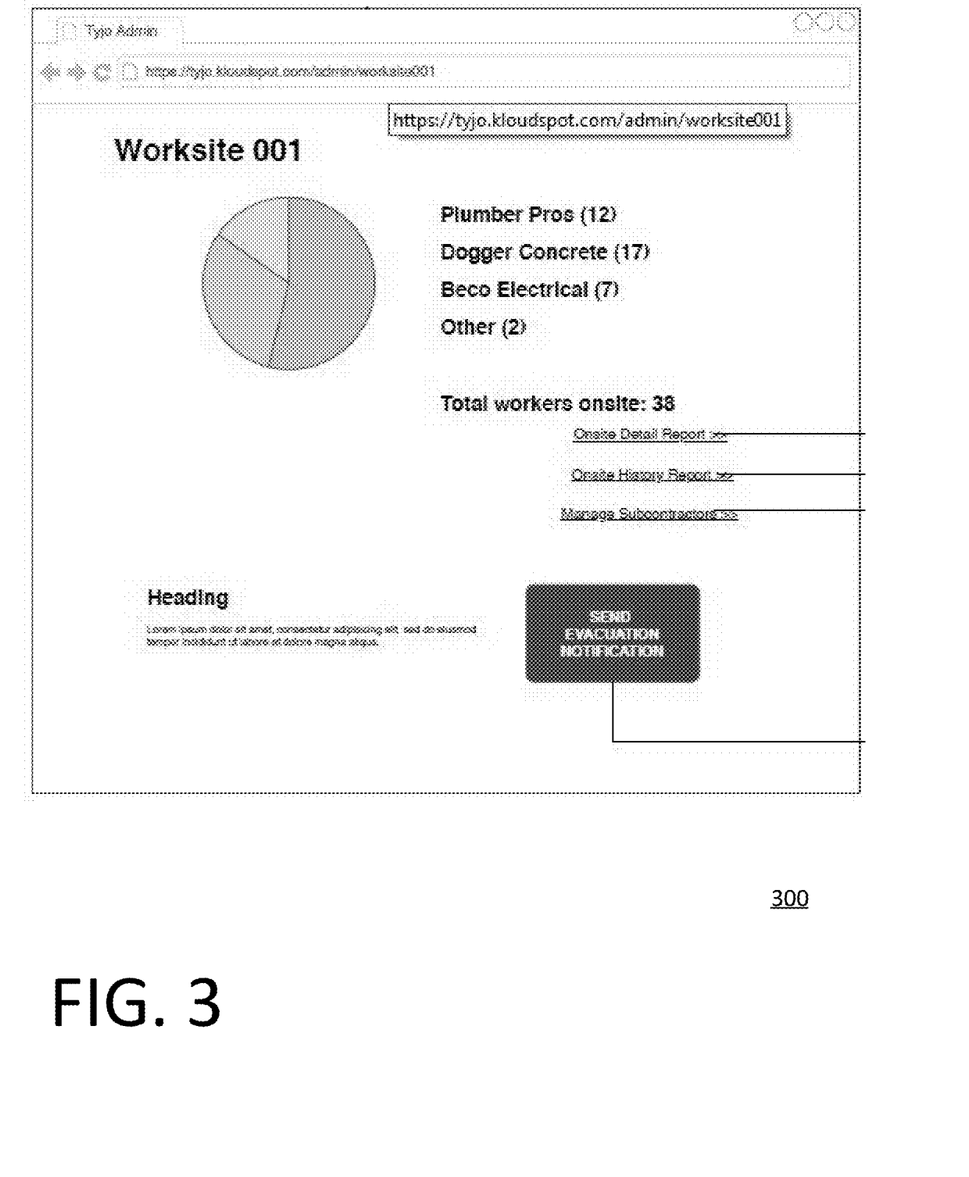
FIG. 3 is a first visual representation of an administrative user experience consistent with certain embodiments of the present invention.

Turning now to FIG. 3, a first visual representation of an administrative user experience consistent with certain embodiments of the present invention is shown. Graphic representation 300 shows an example of a non-emergency homepage with workforce information and hyperlinks to additional reports, along with a hyperlink to activate the Evacuation Notification sub-process.

Figure 4A:
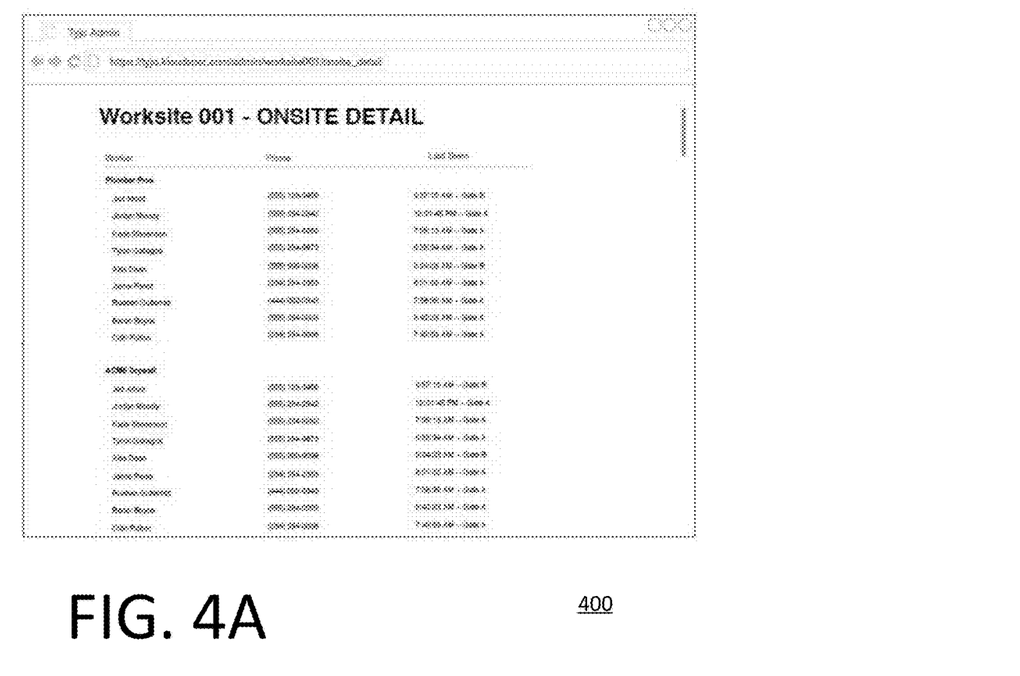
FIG. 4A is a second visual representation of an administrative user experience consistent with certain embodiments of the present invention.

Turning now to FIG. 4A, a second visual representation of an administrative user experience consistent with certain embodiments of the present invention is shown. Graphic representation 400 exemplifies a non-emergency report regarding workforce detail available to an administrator by following a hyperlink from the homepage exemplified in FIG. 3.

Figure 4B:
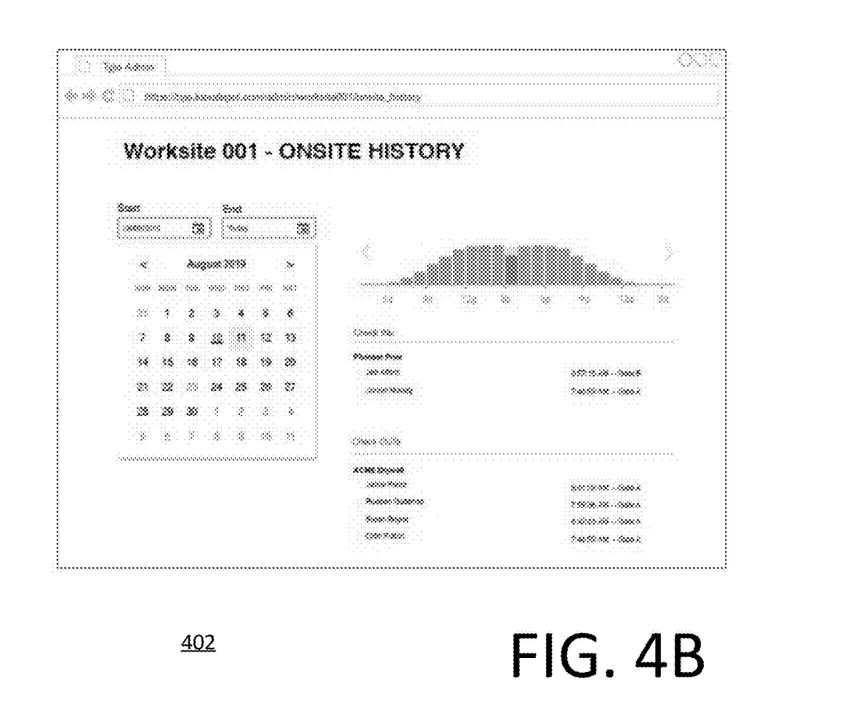
FIG. 4B is a third visual representation of an administrative user experience consistent with certain embodiments of the present invention.

Turning now to FIG. 4B, a third visual representation of an administrative user experience consistent with certain embodiments of the present invention is shown. Graphic representation 402 exemplifies a non-emergency report regarding workforce history available to an administrator by following a hyperlink from the homepage exemplified in FIG. 3.

Figure 5:
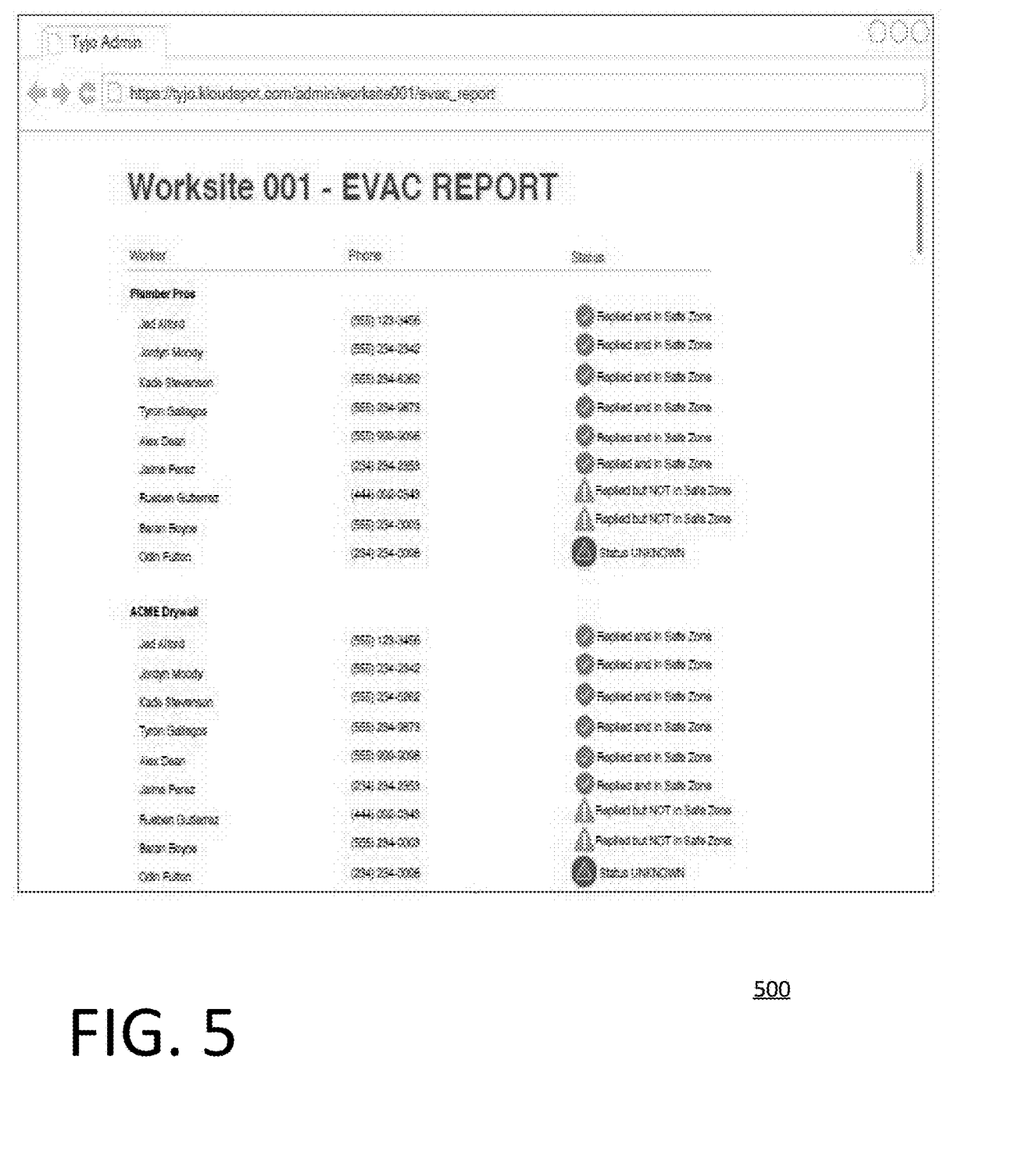
FIG. 5 is a fourth visual representation of an administrative user experience consistent with certain embodiments of the present invention.

Turning now to FIG. 5, a fourth visual representation of an administrative user experience consistent with certain embodiments of the present invention is shown. Graphic representation 500 exemplifies an emergency report regarding worker safety status.

Figure 6:
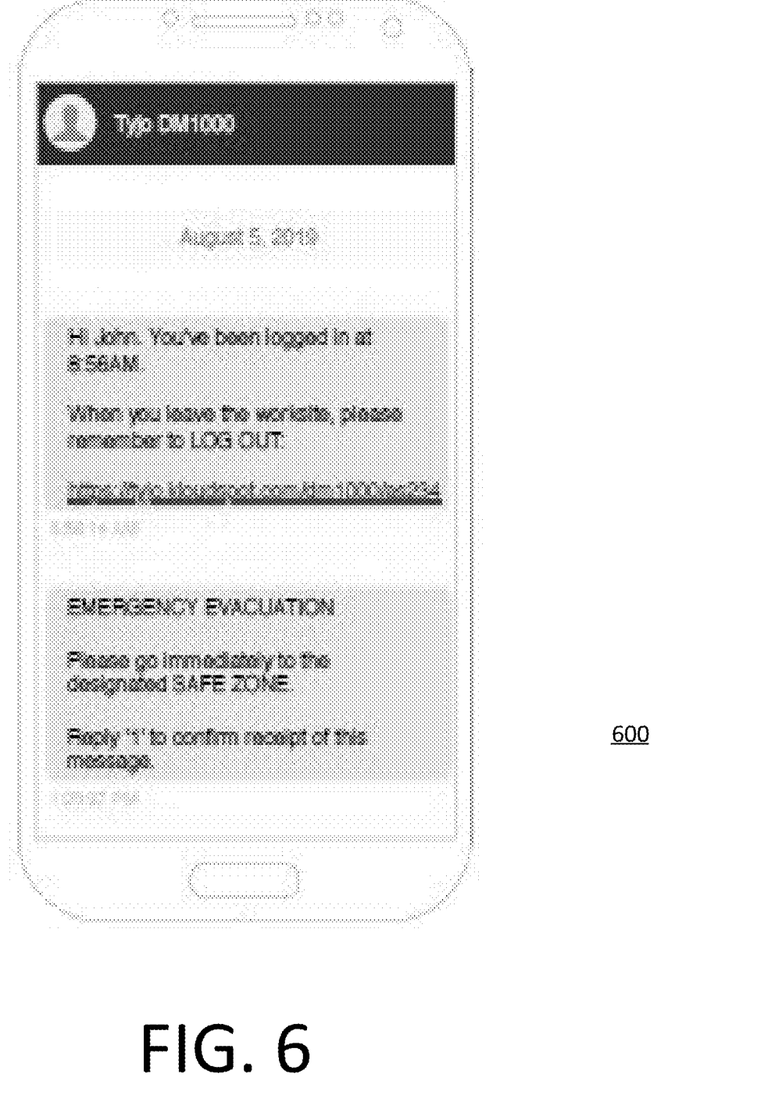
FIG. 6 is a visual representation of a worker user experience consistent with certain embodiments of the present invention.

Turning now to FIG. 6, a visual representation of a worker user experience consistent with certain embodiments of the present invention is shown. Graphic representation 600 exemplifies both non-emergency and emergency system communications as received by a worker on a registered and logged-in mobile device.

While certain illustrative embodiments have been described, it is evident that many alternatives, modifications, permutations and variations will become apparent to those skilled in the art in light of the foregoing description.

I claim:

1. A method for managing jobsite personnel comprising: associating a data server with a unique physical location; establishing communication between one or more mobile devices and said data server as a network access point; associating each of the one or more mobile devices with a unique human user; registering each of the one or more mobile devices as being physically located within a pre-established physical location boundary of a jobsite; identifying each of the one or more mobile devices and logging each identity as being physically located within said jobsite; sending an emergency message to each of the one or more mobile devices including a prompt requiring a time-sensitive response from each user; tracking each of the one or more mobile devices to determine a time of receipt at said server for each time-sensitive response; comparing each time of receipt of said time-sensitive response as in compliance with said emergency message; and providing a compliance report for all of the one or more mobile devices.

2. The method of claim 1 where the jobsite is a construction jobsite.

3. The method of claim 1 where the emergency message directs each unique human user to evacuate a given physical space within a set time period.

4. The method of claim 1 where the tracking of each of the co-located one or more mobile devices is performed by user self-reporting.

5. The method of claim 1 where the tracking of each of the co-located one or more mobile devices is performed using automated radio navigation.

6. A system for managing jobsite personnel comprising:
a data server with a processor; a router associated with a unique physical location; one or more mobile devices in communication with the data server, the one or more mobile devices using the router as a network access point; associating each of the one or more mobile devices with a unique human user; registering each of the one or more mobile devices; co-locating the one or more mobile devices with the unique physical location; identifying each of the co-located one or more mobile devices and logging each identity into a database; the server sending an emergency message including a prompt requiring time-sensitive compliance to each co-located one or more mobile device; tracking each of the one or more mobile devices to determine a time of receipt at said server for each time-sensitive response; comparing each time of receipt of said time-sensitive response as in compliance with said emergency message; and providing a compliance report on each of the co-located one or more mobile devices.

7. The system of claim 6 where the unique physical location is a construction jobsite.

8. The system of claim 6 where the co-locating of the one or more mobile devices with the unique physical location is performed by the one or more mobile devices' use of the router associated with a unique physical location.

9. The system of claim 6 where the emergency message directs each unique human user to evacuate a given physical space within a set time period.

10. The system of claim 6 where the tracking of each of the co-located one or more mobile devices is performed by user self-reporting.

11. The system of claim 6 where the tracking of each of the co-located one or more mobile devices is performed using automated radio navigation.

\* \* \* \* \*